July 13, 1943. L. W. BLAU Re. 22,345

PROCESS FOR LOCATING VALUABLE SUBTERRANEAN DEPOSITS

Original Filed Feb. 27, 1939

Ludwig W. Blau INVENTOR.

BY P. L. Young ATTORNEY.

Reissued July 13, 1943

Re. 22,345

UNITED STATES PATENT OFFICE 22,345

PROCESS FOR LOCATING VALUABLE SUBTERRANEAN DEPOSITS

Ludwig W. Blau, Houston, Tex., assignor to Standard Oil Development Company, a corporation of Delaware Original No. 2,269,889, dated January 13, 1942, Serial No. 258,811, February 27, 1939. Application for reissue August 20, 1942, Serial No. 455,512

11 Claims. (Cl. 23—230)

Figure 3:
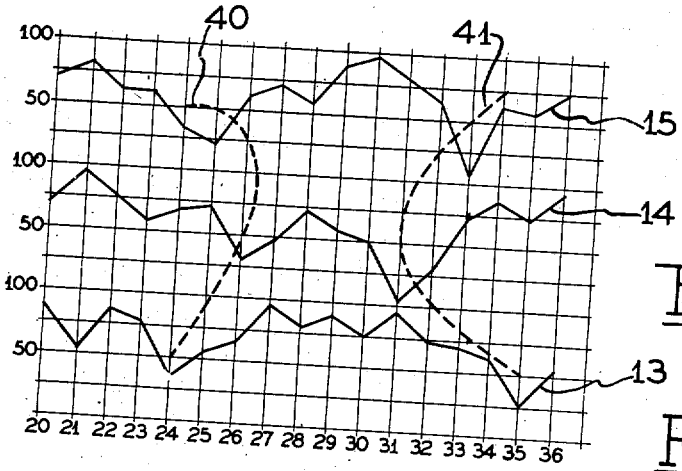

The present invention is directed to a method for locating subterranean deposits of oil. This application is a continuation in part of my copending application Ser. No. 174,215, filed November 12, 1937, and differs therefrom essentially by the inclusion of an explanation of the phenomenon upon which the invention is based.

For the past several years prospecting for oil has been based mainly on geological and geophysical methods, the latter being used almost exclusively in certain areas having a topography unsuitable for geological investigation. Geophysical methods do not directly locate an oil deposit, but locate only substructures which are adapted for the accumulation of oil. It is not rare to find a suitably adapted substructure which is not accompanied by a deposit of oil in commercially producible quantities. Consequently, it is of vital interest to the oil prospector to have at his disposal a method by which oil deposits can be directly located.

It is an object of the present invention to provide an oil prospecting method by means of which it is possible to locate subterranean deposits of oil without regard to the geological structure in which they occur.

It is a further object of the present invention to provide such a method in which careful chemical analyses are not necessary and which does not require scientific training for its application.

The oil prospecting method of the present invention is based on the discovery that a subsurface deposit of oil imparts to the surface soil above it the property of undergoing a color change when treated with certain chemical reagents. As used herein, "color change" has a broad meaning which includes changes in intensity of the same color. It is not known to what this property of surface soil over oil deposits may be attributed, nor is it known what is the nature of the chemical reaction which leads to the color change. It has simply been observed as a fact that these color changes do occur upon treatment of the soil with certain reagents and that they are significant in indicating the presence of oil below the surface.

It has been ascertained that hydrocarbon gases diffusing upwardly from oil deposits are consumed by bacteria typified by *Bacillus methanicus* and *Bacillus ethanicus* with the result that these bacteria are multiplied in areas where they are supplied with such gases. These bacteria consume the hydrocarbon gases and appear to convert them by a mechanism, which is not clearly understood, but which presumably includes polymerization and oxidation, into bodies of high molecular weight which appear to be carboxylic acids. These bacteria are described and their action discussed by N. L. Söhngen in Centrbl. Bakt. II, 15: 513–517, 1906, in an article entitled "Über Bakterien, welche Methan als Kohlenstoffnahrung und Energiequelle gerbrauchen." Related bacteria are discussed by N. L. Söhngen in Proefschrift. Delft. 1906 (Bot. Centrbl. 105: 371–372, 1907) in an article entitled "Het onstaan en verdwijnen van Waterstof en Methaan onder den invloed van het organische leven"; by Aiyer in an article in Mem. Dept. Agr. India, Chem. Ser. 5: 177–180, 1920, entitled "The gases of swamp rice soils. V. A. methane-oxidizing bacterium from rice soils"; by E. Münz in Diss. Halle, 1915, in an article entitled "Zur Physiologie der Methanbakterien"; by K. Störmer in Jahresb. Ver. angew. Bot. for 1907, 5: 113–131, 1908 in an article entitled "Über die Wirkung des Schweffelkohlenstoffs und ähnlicher Stoffe auf den Boden"; and by J. Tausz and M. Peter in Centrbl. Bakt. II, 49: 497–554, 1920, in an article entitled "Neue Methode der Kohlenwasserstoffanalyse mit Hilfe von Bakterien."

The chemical reagent employed in the practice of the present invention apparently effects a color change by acting upon the result of the action of these bacteria upon the hydrocarbon gases. Whether this color change is due to the greatly increased number of bacteria present or due to some high molecular weight substance resulting from the action of the bacteria on the hydrocarbons is not yet fully established. For the sake of accuracy, therefore, a reagent which is employed according to the present invention may be generically defined as one which is capable of effecting a color change when applied to a material, containing hydrocarbon-consuming bacteria, which has been subjected to the action of hydrocarbons.

Experiment has demonstrated that the reagents which have performed most consistently in this capacity are those which are water soluble alkaline materials which are preferably oxidizing agents in the sense that they are capable of yielding metalloids in alkaline media. The best reagent which has thus far been found is sodium peroxide. Sodium perborate has also proven very effective. Sodium hydroxide is less effective than these but does produce a measurable effect. Sodium polysulfide has also given good results. Positive results have also been secured with potassium permanganate.

In addition to these reagents of an alkaline nature, however, other reagents, such as strong mineral acids, notably hydrochloric and sulfuric acids, have produced noticeable and significant color changes in aqueous dispersions of soil samples. 2, 4 diaminophenol dihydrochloride has also given evidence of being a suitable reagent.

It may be postulated that the bacteria convert hydrocarbons, such as methane, ethane, propane and butane, into substances which are either color bodies per se, or yield a color when treated with suitable reagents. Some evidence points to the fact that the reagent simply frees the color body from the soil sample, and this color body being presumably a carboxylic acid is saponified by the agent, when the latter is alkaline, thereby giving a colored solution. The color body itself does not appear to be soluble in water. Solutions of the color body in organic solvents have very little color. When the chemical reagent employed is also an oxidizing agent, the color appears to be intensified, which may be accounted for by the fact that the color bodies are probably unsaturated carboxylic acids which readily undergo oxidation.

In general, it may be stated that the method of the present invention is carried out on a test tube scale. For example, a test tube is half filled with the liquid obtained by mixing the soil sample with water and allowing the sediment to settle leaving a supernatant liquid. To this liquid is added a pinch of the desired reagent, for example, sodium peroxide. Typical amounts of materials to be used are 1 gr. of soil, ½ gr. of sodium peroxide, and 17 cc. of water. Instead of adding the reagent to the mixture of water and sample, the reagent can be added dry to the sample and the water added to the mixture. Again, the reagent may be added to the water and the solution added to the sample.

The characteristic color change produced by a majority of the above recited reagents varies from a deep red to a light yellow, depending upon the oil productiveness of the area in which the sample tested was collected, the deeper color designating oil deposits below the area. It is to be understood that it is not necessary to produce a clear menstruum from the soil sample where visual comparison of the samples is to be practiced. The use of clear liquid menstruum is mentioned because in the specific embodiment of the present invention explained hereinafter, color intensity is measured by the translucence of the sample, and it is desired, for the sake of accuracy, not to permit the results to be distorted by the presence of the suspended material in the sample.

A peculiar aspect of the present invention is the fact that these color changes are most markedly noticeable in samples of soil collected above the edge of a subsurface oil deposit. In other words, by the method of the present invention it is possible to outline approximately the area of production in an oil field. This phenomenon corresponds with the observations of those who practice the method of prospecting by soil gas analysis who have advanced what has been termed the "halo" theory of soil gas diffusion.

In the practice of the present invention, the soil samples are collected along certain selected lines or at certain selected points in the area under investigation. The soil used for the sample is preferably that obtained at the surface to a depth, not greater than eight inches and, preferably, within the first four inches. Since the bacteria to which the color changes obtained in the practice of the present invention are attributed are aerobic in character, the sample of soil should be collected as near the surface as possible. In taking the sample the exposed surface of the soil together with any vegetation it may carry is scraped away and the soil sample collected immediately below the surface. The scraping-away of the surface is only for the purpose of avoiding the occurrence of roots and vegetation in the sample. In some areas this is not necessary. In any given area all samples should be collected at the same depth.

As previously explained, each sample is subjected to the action of a reagent in any of the ways heretofore explained, whereby a color is secured for each sample. These colors are compared to determine their relative intensities. Since the method is one in which various samples are compared, it is apparent that for the sake of accuracy the same amount of soil and the same amount of detecting agent should be used for each test so that color will be the only variable.

Over a given area, a fairly wide variation in color intensity may be observed. The observed values of color will also change with the type of measuring apparatus employed and with the calibration of the apparatus. Accordingly, a color value selected as a standard with one apparatus calibrated in a certain way cannot be employed with another apparatus or a different calibration of the same apparatus. It has also been observed that colors obtained in a given area undergo seasonal changes. Thus, a sample examined in July from a given point will usually have quite a different color from a sample from substantially the same point examined in December, the latter sample usually having a deeper color. Another factor which enters into the color obtainable by a given sample, is the replaceable calcium and magnesium content of the soil. High concentrations of these materials tend to yield lighter colors. For this reason, in drawing conclusions from colors obtained from samples over a given area, some consideration should be given to the replaceable calcium and magnesium content of the soil in that area. Another precaution which should be observed is that the taking of samples from surfaces which have recently been disturbed as by ploughing, grading, etc., should be avoided, if possible.

Figure 1:
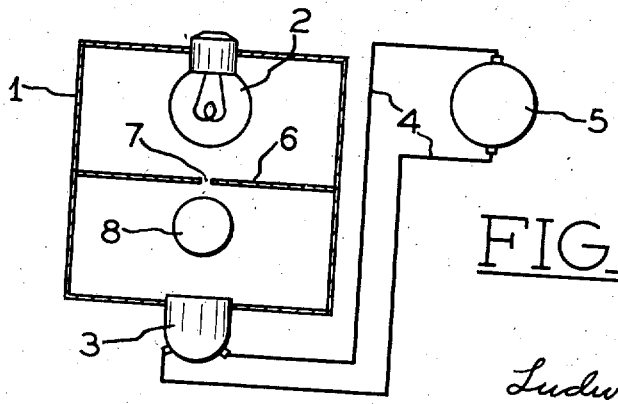

The nature and objects of the present invention will be better understood from the following detailed description of the accompanying drawing in which Fig. 1 is a plan view of one form of apparatus which may be used for measuring the color of the sample.

Figure 2:
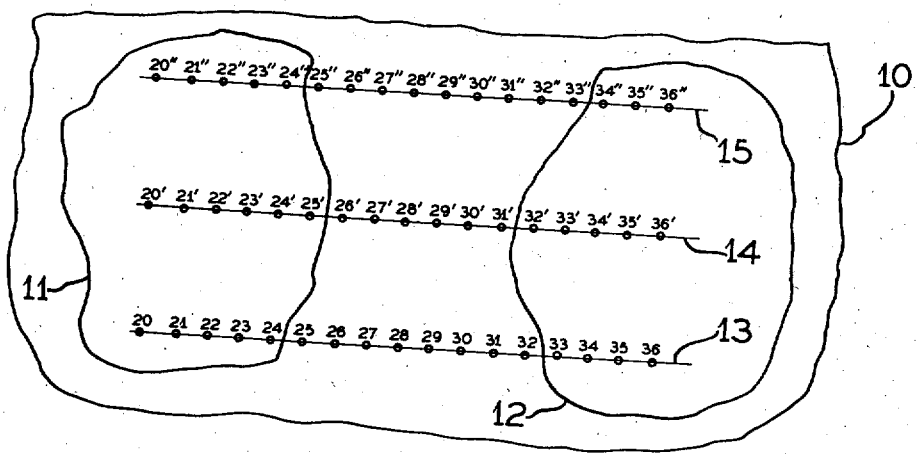

Fig. 2 is a graphical illustration of one type of procedure which may be followed in collecting samples, and Fig. 3 is a graphic illustration of one type of procedure which may be following in correlating the results.

Referring to Fig. 1, numeral 1 designates a box having at one end a source of light 2, and at the other end a photoelectric cell 3 connected by leads 4 to a microammeter 5. Between the source of light and the photoelectric cell is a partition 6 having an opening 7 of a width such that it is covered by a test tube 8 which is suspended in the box in any suitable manner and contains the sample to be examined. As is known the current set up by a photoelectric cell is a function of the intensity of color of the sample. For any given apparatus a sample obtained at the edge of a known oil field is examined and the current observed. Samples taken inside the edge of the oil field and outside the edge of the oil field are then examined. These will give colors of less intensity than the samples on the edge of the oil field. A color value of an intensity intermediate that in the edge of the field and that off the edge of the field is then arbitrarily selected as a standard above which oil deposits are not indicated and below which they are indicated.

Instead of examining each sample in the photronic cell, a number of standard blanks of different colors or intensities of color can be set up each having a value determined by examination in the photronic cell. These blanks will vary by degrees from the lightest to the darkest color which can be expected in the samples to be examined. The blanks are arranged in a row before a uniform source of light and each sample is compared with the blanks so that its color may be determined. This, it will be noted, is actual color determination by visual inspection rather than the test of translucence which is performed with the photronic cell. Therefore in this latter technique, it is not so important that the presence of suspended matter in the liquid undergoing inspection be avoided.

Referring to Fig. 2, numeral 10 designates an area having known oil fields 11 and 12. A series of samples are collected along lines 13, 14, and 15. These lines need not be straight parallel lines, but can be of any desired curvature or can run in any direction. The arrangement shown is adopted for the purpose of clarity. The points at which samples are taken along line 13 are designated as 20 to 36. The points along line 14 are designated as 20' to 36'. The points along line 15 are designated 20'' to 36''.

A graph, shown in Figure 3, is made up having the stations along the abscissa and color intensities along the ordinate. In the particular case illustrated preliminary tests demonstrated that a color value below 50 was indicative of the edge of an oil field. The sample collected along line 13 had the color values shown in the curve marked 13. The samples collected along 14 had color intensities shown on the curve 14. The samples collected along 15 had the color intensities shown in the curve marked 15.

In the graph the ordinate is divided into groups of color values of from 0 to 100, one group for each set of samples. The ordinate scale is such that the distance between successive values of color of 50 is proportionate to the distance between the lines along which samples are taken.

In mapping the results those samples along each line which have a color value below 50 are indicated on the abscissa having a value of 50. The points so obtained are then connected by dotted lines 40 and 41. These lines indicate the approximate edge of the oil deposits in each case. It can be seen from the drawing which illustrates an actual case that the edge of production measured corresponds fairly closely to the actual edge of production.

As previously stated, it is to be understood that the procedure outlined above is merely one type of procedure that may be followed. It is evident that a separate graph need not be drawn, since the points in the area, at which samples having a significant color value are obtained, can be indicated on the map of the area itself and these points connected by a line representing the edge of production. In fact, this is the actual procedure followed since the lines along which the samples are taken are usually not of a configuration and arrangement which lend themselves readily to graphical presentation.

The practice of the present invention has hereinbefore been described with reference to the treatment of soil samples with agents capable of reacting with a color change with a sample of soil containing hydrocarbon-consuming bacteria which has been exposed to the action of hydrocarbons. From what has been said with respect to these bacteria and their reaction with hydrocarbons, other methods of practicing the present invention readily suggest themselves. For example, it is possible to test the soil sample microscopically for the presence of hydrocarbon-consuming bacteria, whereby their intensity can be determined. *Bacillus methanicus* is oblong in shape and does not form chains. *Bacillus ethanicus* is likewise non-chain-forming and is shorter and wider than *Bacillus methanicus*, and usually assumes the shape of a regular polygon.

Again, since it is known that heavy organic bodies result from the action of these bacteria on hydrocarbon gases, it is possible to examine soil samples for the presence of these heavy compounds. For example, the soil samples may be subjected to the action of ultraviolet light and the presence of these heavy organic bodies ascertained by fluorescence. Again, the soil may be extracted with known solvents for heavy organic compounds of this type and the extract evaporated to dryness leaving the organic compounds as a residue. Basically, therefore, the present invention resides in the discovery that hydrocarbon gases diffusing upwardly from oil deposits react with certain bacteria at the surface causing these bacteria to multiply and producing heavy organic compounds, and embraces all methods by which the occurrence of this phenomenon may be observed.

The nature and objects of the present invention having been thus described and illustrated what is claimed as new and useful and is desired to be secured by Letters Patent is:

1. A method of prospecting for petroleum deposits which comprises collecting samples of soil at spaced points along the surface over an area under investigation, and examining said samples for the determination of the presence therein of a product of the action of hydrocarbon-consuming bacteria on hydrocarbons.

2. A method of prospecting for petroleum deposits which comprises collecting samples of soil at spaced points along the surface over an area under investigation, and treating the samples with a chemical reagent which is capable of effecting a color change when applied to material containing hydrocarbon-consuming bacteria which has been subjected to the action of hydrocarbons.

3. A method according to claim 2 in which the agent is a water-soluble material having an alkaline reaction.

4. A method according to claim 2 in which the agent is a water-soluble alkali metal compound having an oxidizing action and the treatment is carried out in an aqueous medium.

5. A method of prospecting for petroleum deposits which comprises collecting samples of soil at spaced points along the surface of an area under investigation, forming aqueous suspensions of said samples, treating the samples separately with sodium peroxide and comparing the colors of the treated samples.

6. In a method of exploration for deposits of hydrocarbon matter, the steps of systematically collecting samples of soil at different points throughout a region, and analyzing said samples for the presence therein of hydrocarbon-consuming bacteria in order to determine the location and the extent of said hydrocarbon deposits.

7. A method of prospecting for petroleum deposits which comprises collecting samples of soil at spaced points along the surface over an area under investigation, and examining said samples for the quantitative determination of the content therein of a product of the action of hydrocarbon-consuming bacteria on hydrocarbons.

8. In a method of exploration for deposits of hydrocarbon matter, the steps of systematically collecting samples of soil at different points throughout a region and analyzing said samples for the content therein of hydrocarbon-consuming bacteria in order to determine the location and the extent of said hydrocarbon deposits.

9. A method of prospecting for petroleum deposits which comprises collecting samples of soil at spaced points along the surface over an area under investigation, treating the same amount of each sample with the same amount of a chemical agent which is capable of effecting a color change when applied to material containing hydrocarbon-consuming bacteria which has been subjected to the action of hydrocarbons, and examining the colors of the resulting mixtures.

10. A method of prospecting for petroleum deposits which comprises collecting samples of soil at spaced points along the surface of an area under investigation, treating the same selected amount of each sample with the same selected amount of an aqueous solution of a water-soluble material having an alkaline reaction and being capable of effecting a color change when applied to material containing hydrocarbon consuming bacteria which has been subjected to the action of hydrocarbons, and determining the color intensities of the individual mixtures so formed.

11. A method of prospecting for petroleum deposits which comprises collecting samples of soil at spaced points along the surface of an area under investigation, treating the same selected amount of each sample with the same selected amount of an aqueous solution of a water-soluble alkali metal compound having an oxidizing action, and measuring the color intensities of the individual mixtures so formed.

LUDWIG W. BLAU.